United States Patent
Tang

(10) Patent No.: US 6,842,794 B2
(45) Date of Patent: Jan. 11, 2005

(54) METHOD FOR STARTING A DATA PROCESSING SYSTEM VIA A FLASH MEMORY DEVICE

(75) Inventor: Chih-Chien Tang, Taipei (TW)

(73) Assignee: Inventec Corporation, Taipei (TW)

( * ) Notice: Subject to any disclaimer, the term of this patent is extended or adjusted under 35 U.S.C. 154(b) by 71 days.

(21) Appl. No.: 10/445,052

(22) Filed: May 27, 2003

(65) Prior Publication Data

US 2004/0243793 A1 Dec. 2, 2004

(51) Int. Cl.[7] .............................................. G06F 13/00
(52) U.S. Cl. ........................ 710/10; 710/104; 710/13; 713/1
(58) Field of Search ........................ 710/10, 104, 8–13, 710/62–64, 72–74; 711/100–115; 713/1–2

(56) References Cited

U.S. PATENT DOCUMENTS

| | | | | |
|---|---|---|---|---|
| 6,493,770 | B1 * | 12/2002 | Sartore et al. ................. | 710/8 |
| 6,505,263 | B1 * | 1/2003 | Larson et al. ................ | 710/100 |
| 6,515,821 | B2 * | 2/2003 | Kato et al. ................ | 360/78.13 |
| 6,560,099 | B1 * | 5/2003 | Chang ........................ | 361/685 |
| 6,718,401 | B2 * | 4/2004 | Nalawadi et al. ............. | 710/13 |
| 6,757,783 | B2 * | 6/2004 | Koh ........................... | 711/115 |
| 6,776,348 | B2 * | 8/2004 | Liu et al. ..................... | 235/492 |
| 6,785,807 | B1 * | 8/2004 | Aguilar et al. ................. | 713/2 |
| 6,792,501 | B2 * | 9/2004 | Chen et al. .................. | 711/103 |
| 6,795,327 | B2 * | 9/2004 | Deng et al. .................... | 365/63 |

* cited by examiner

*Primary Examiner*—Christopher Shin
(74) *Attorney, Agent, or Firm*—Birch, Stewart, Kolasch & Birch, LLP

(57) ABSTRACT

A method for activating the data processing system via a flash memory device is disclosed. The method involves connecting the USB Flash Memory device with the data processing system and storing the driver of the USB Flash Memory device in the BIOS of the data process system. When activating the system, the driver drives the USB flash memory device and then a startup program in the USB memory flash device activates the system.

10 Claims, 3 Drawing Sheets

METHOD FOR STARTING A DATA PROCESSING SYSTEM VIA A FLASH MEMORY DEVICE

BACKGROUND OF THE INVENTION

1. Field of Invention

The invention is related to a method for starting a data processing system, and more particularly a method for starting a data processing system using a flash memory device.

2. Related Art

Computer technology has advanced rapidly in the recent years and has brought much convenience. Data processing systems, computing devices or computers help people deal with many complicated daily things and affairs. Thus, there are many specific functions, such as database, file storing, printers, e-mail and web sites, designed for specific users.

Before the data processing system deals with the tasks above, a startup process to activate the system is needed. The general startup process is through the hard disk connected to an IDE (Integrated Driver Electronics) interface or a CD-ROM (Compact Disk-Read Only Memory). A floppy disk, having a startup program, is also an option. The devices, which need to be driven through the I/O port, cause a longer startup time and more power consumption. The longer startup time and the more-powered consumption are not economic.

Using a flash memory device, connected to a data processing system via a USB interface, results in a problem with the driver. That's because the driver of the USB is installed in the operation system (OS) of the data processing system. Thus, the USB port is not activated if the startup process of the data process system is not complete. Further, the start-up process is slower and consumes more power. So a method for activating the data processing system, using a flash memory device, is necessary.

SUMMARY OF THE INVENTION

The main object of the invention is to provide a method for starting a data processing system via a flash memory device to shorten the startup time.

Another object of the invention is to provide a method to lower the power consumption of the data processing system.

To achieve the object of activating the data processing system via the flash memory device, the method of the invention involves connecting the USB Flash Memory device with the data processing system and storing the driver of the USB Flash Memory device in the BIOS of the data process system. When activating the system, the driver drives the USB flash memory device. Then a startup program in the USB Flash Memory device activates the system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
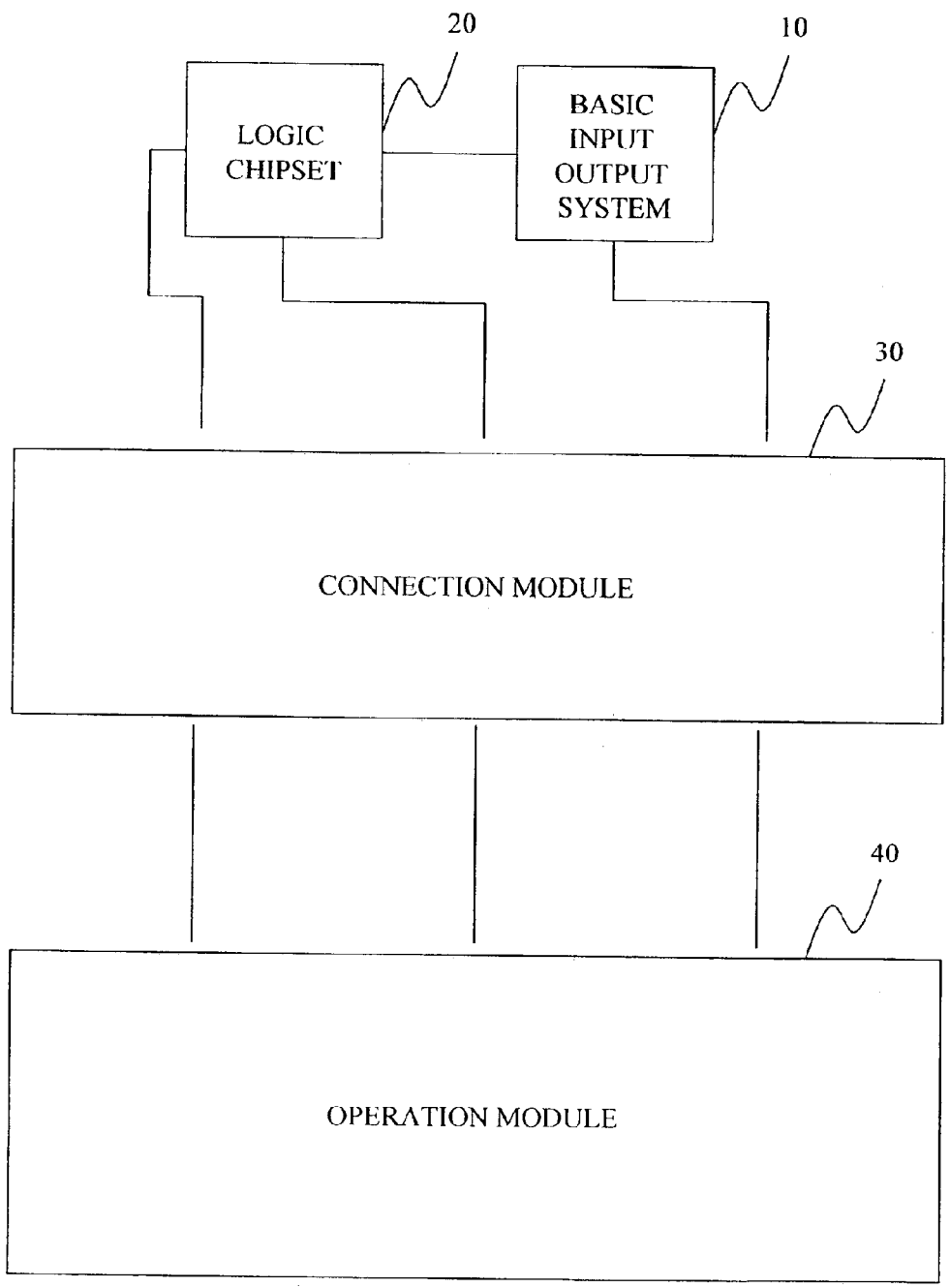
FIG. 1 is the block diagram of part 1 showing the method for starting a data processing system using a flash memory device.

The invention is related to a method for activating a data processing system, using a flash memory device. Before illustrating the method of the invention, please refer to FIG. 1 showing the internal block of the data processing system. The connection between the flash memory device and the data processing system is described in detail.

As illustrated, the data processing system includes BIOS 10 and a logical chipset 20. The BIOS 10 and the logical chipset 20 are connected to the connection module 30. A startup program for activating the data process system is stored in the BIOS 10. The startup program is compatible with the USB interface. The connection module 30 is connected to an operation module 40. The connection module 30 includes some of the interfaces for communicating with the peripherals connected, to the data processing system via interfaces. The operation module 40 includes the peripherals in charge of operation.

Figure 2:
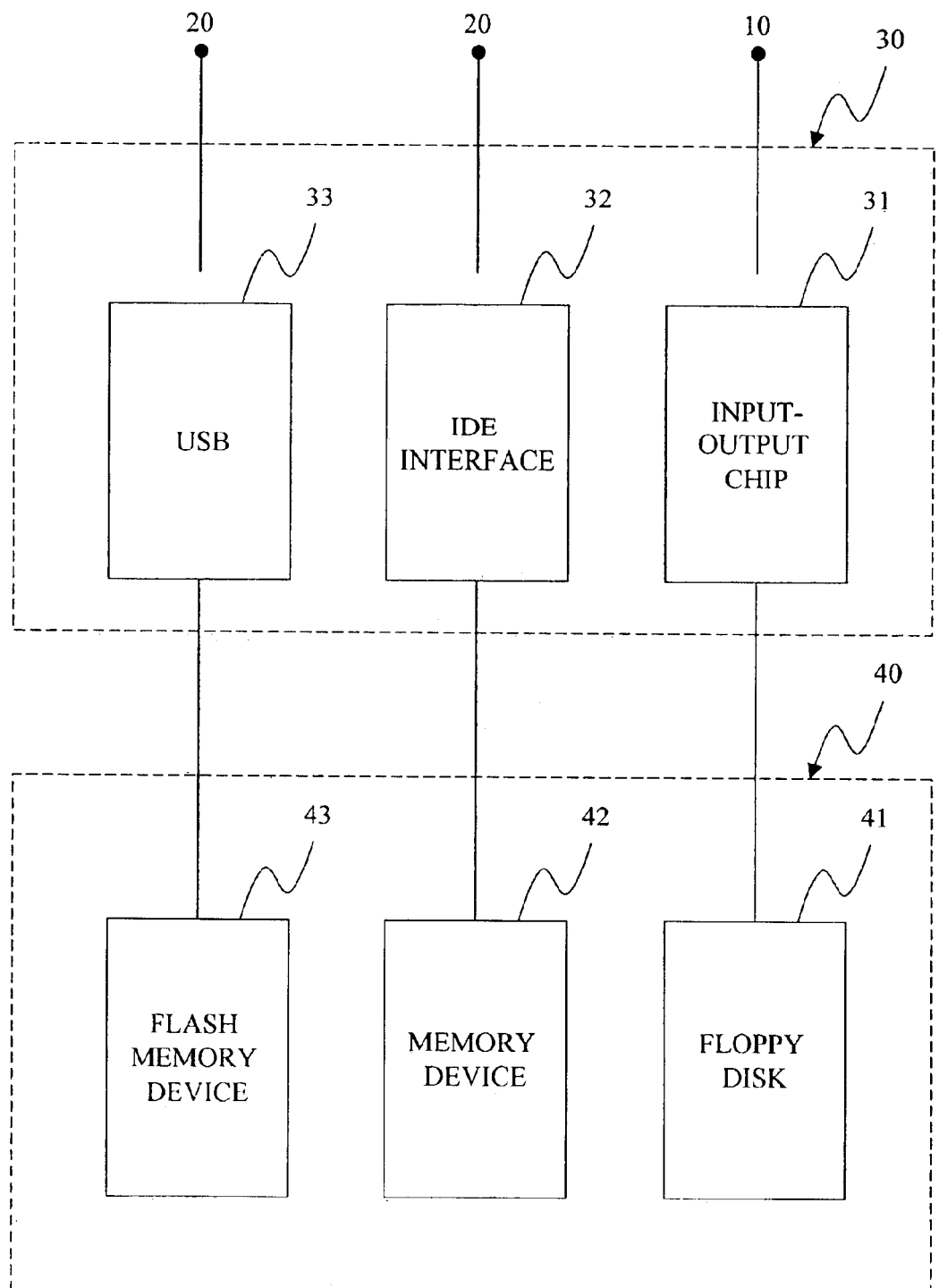
FIG. 2 is the block diagram of part 2 showing the method for starting a data processing system using a flash memory device.

The details of the connection module 30 and the operation module 40 are described as follows. Please refer to FIG. 2.

The connection module 30 includes an input-output chip 31, IDE (Integrated Drive Electronics) interface 32 and a USB (Universal Serial Bus) 33. The input-output chip 31 is a Floppy Controller for communicating with the BIOS 10 directly. The IDE interface 32 and the USB are connected to the logical chipset 20. There are two slots in the IDE interface 32 for connecting to the peripherals via bus lines. Each bus line connects with two peripherals. In other words, the IDE interface 32 has four slots: a primary master slot, a primary slave slot a secondary master slot and a secondary slave slot.

The operation module 40 includes a floppy disk 41, a memory device 42 and a flash memory device 43. The floppy disk is connected to the input-output chip 31 for communicating with the BIOS 10 directly. The memory device 42 is connected to the IDE interface 32. The memory device 42 includes a hard disk 42 and a CD-ROM. The flash memory 43 has a USB interface for being connected to the USB 33.

Figure 3:
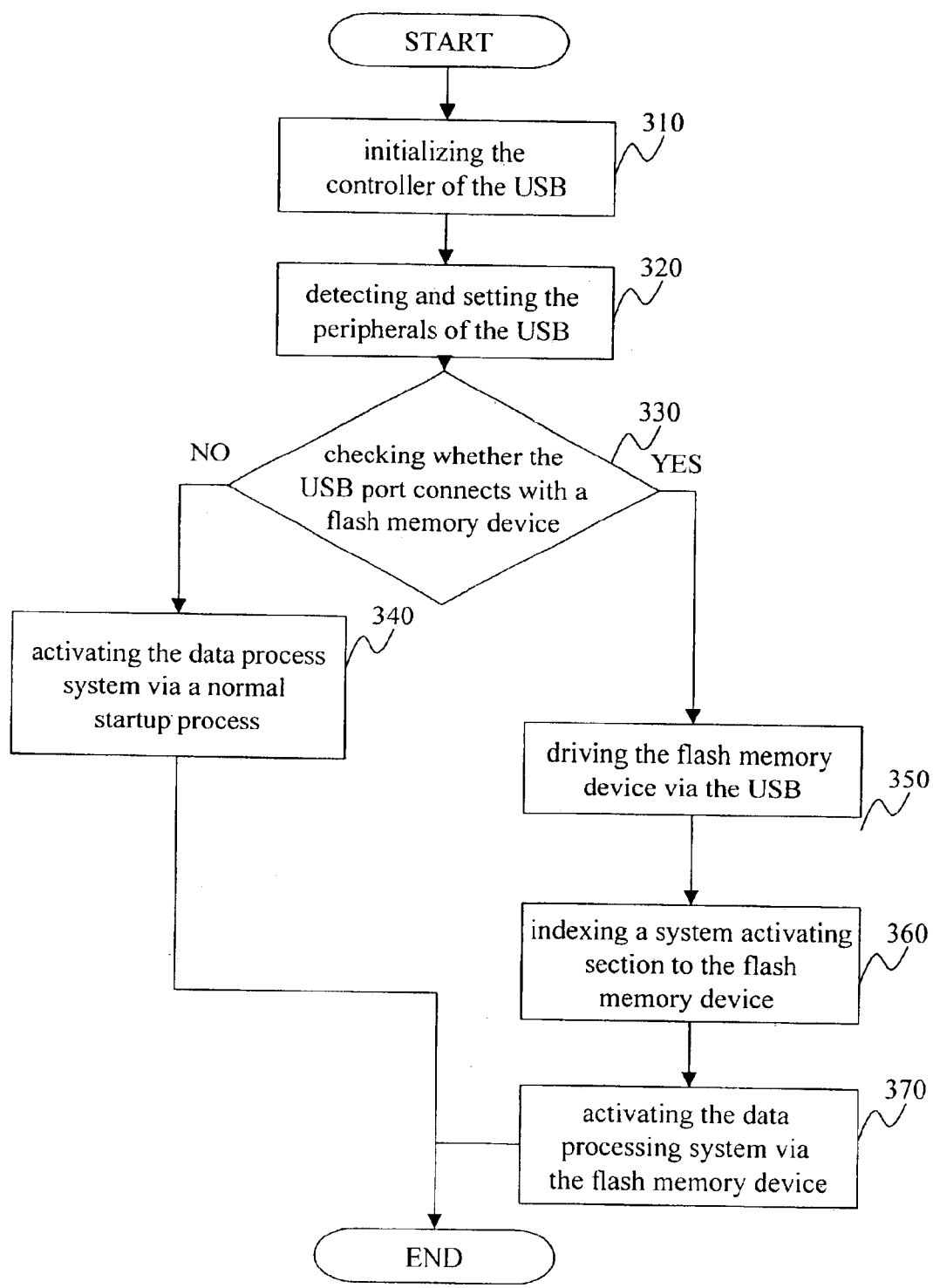
FIG. 3 is the flow chart of the invention for starting a data processing system, using a flash memory device.

The flow of the method of the invention is illustrated as follows. Please refer to FIG. 3 showing the flow chart of the invention.

When turning on the data processing system, the controller of the USB is initialized (step 310), then is detected by the BIOS. Likewise, the peripherals of the USB are setup. Meanwhile, the data processing system judges whether the USB connects to a flash memory device (step 330). If the data processing system does not connect to a flash memory device, a normal startup process activates the system (step 340). If a flash memory has connected to the system, the flash memory device is driven by the USB (step 340) and the system activating section is indexed to the flash memory device (step 360). Finally, the flash memory device activates the system (step 370). A normal process of step 340 involves adopting the floppy disk, the hard disk or the CD-ROM. Conclusion: the advantage of the method of the invention is to shorten the startup time and the power consumption when activating the system. The USB flash memory device driver is stored in the BIOS to drive the memory device when the BIOS is operating. Thus, it is needless to install a driver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for starting a data processing system via a flash memory device which is connected with the system through a USB interface, wherein a start-up program is installed in the system flash memory device, comprising the steps of:

initializing a controller of the USB;

detecting and setting the flash memory device and peripherals of the USB;

transmitting a driver to drive the flash memory device through the USB;

indexing a system activating section the startup program to the flash memory device; and activating the data processing system via the startup program of the flash memory device.

2. The method of claim 1, wherein the driver is stored in a BIOS, and is transmitted through the USB when turning on the data processing system.

3. The method of claim 2, wherein the system further comprises a logic chipset between the BIOS and the USB for communicating other interfaces of the data processing system.

4. The method of claim 3, wherein the chipset is a South Bridge chipset.

5. The method of claim 1, wherein the steps of detecting and setting the peripherals of the USB involve a step of entering to a normal startup process when the flash memory device is not connected with the USB.

6. The method of claim 5, wherein the step of normal startup process involves activating the system via a floppy disk.

7. The method of claim 5, wherein the step of normal startup process involves activating the system via a hard disk.

8. The method of claim 5, wherein the step of normal startup process involves activating the system via a CD-ROM.

9. The method of claim 1, wherein the flash memory device further comprises a USB interface.

10. The method of claim 1, wherein the startup program is compatible with the USB interface.

* * * * *